(12) United States Patent
Conard et al.

(10) Patent No.: US 6,949,710 B2
(45) Date of Patent: Sep. 27, 2005

(54) MAIL WEIGHING SYSTEM AND SCALE APPARATUS

(75) Inventors: Walter Conard, Lake Villa, IL (US); Patrick Casher, North Aurora, IL (US); John O'Callaghan, Skokie, IL (US); Daniel Gibbons, Arlington Heights, IL (US); Fredrick Hegland, Lake Zurich, IL (US); Roy Schoon, Glenview, IL (US); George Rabindran, Davie, FL (US)

(73) Assignee: Bowe Bell + Howell Postage Systems Company, Lincolnwood, IL (US)

( * ) Notice: Subject to any disclaimer, the term of this patent is extended or adjusted under 35 U.S.C. 154(b) by 130 days.

(21) Appl. No.: 10/087,446

(22) Filed: Mar. 1, 2002

(65) Prior Publication Data

US 2003/0230435 A1 Dec. 18, 2003

(Under 37 CFR 1.47)

(51) Int. Cl.⁷ ............................................. G01G 19/413
(52) U.S. Cl. ..................... 177/25.15; 177/145; 705/407
(58) Field of Search .............................. 177/25.15, 145; 705/407

(56) References Cited

U.S. PATENT DOCUMENTS

| | | | |
|---|---|---|---|
| 3,643,798 A | 2/1972 | Krupotich | 209/593 |
| 3,861,480 A | 1/1975 | Zucker et al. | 177/210 R |
| 4,778,018 A | 10/1988 | Cordery et al. | 177/210 FP |
| 4,787,046 A | 11/1988 | Feinland et al. | 705/407 |
| 4,787,620 A | 11/1988 | Goldkuhle | 271/111 |
| 4,856,602 A | 8/1989 | Cordery et al. | 177/210 FP |
| 4,932,488 A | 6/1990 | Tsay | 177/145 |
| 4,956,782 A | 9/1990 | Freeman et al. | 705/406 |
| 4,967,857 A | 11/1990 | Kent et al. | 177/145 |
| 5,014,797 A | 5/1991 | Dolan et al. | 177/4 |
| 5,065,000 A * | 11/1991 | Pusic | 235/381 |
| 5,109,937 A | 5/1992 | Kipp | 177/145 |
| 5,170,857 A | 12/1992 | Phillips et al. | 177/145 |
| 5,174,399 A * | 12/1992 | Brauneis | 177/25.15 |
| 5,190,115 A | 3/1993 | Dolan et al. | 177/25.15 |
| 5,326,938 A | 7/1994 | Tolson | 177/5 |
| 5,329,102 A | 7/1994 | Sansone | 235/375 |
| 5,434,366 A | 7/1995 | Troisi | 177/52 |
| 5,508,818 A | 4/1996 | Hamma | 358/403 |
| 5,684,275 A * | 11/1997 | Tolson | 177/119 |
| 5,723,825 A | 3/1998 | Dolan et al. | 177/145 |
| 5,726,393 A | 3/1998 | Lyga | 177/25.15 |
| 5,806,287 A | 9/1998 | Trechsel | 53/287 |
| 6,107,579 A * | 8/2000 | Kinnemann | 177/145 |
| 6,265,675 B1 * | 7/2001 | Hubler et al. | 177/25.15 |
| 6,686,545 B2 * | 2/2004 | Luchinger et al. | 177/180 |

* cited by examiner

Primary Examiner—Randy W. Gibson
(74) Attorney, Agent, or Firm—McDermott Will & Emery LLP

(57) ABSTRACT

An apparatus and method to individually weigh continuously fed mail pieces wherein each mail piece is configured in a vertical orientation and fed through the weighing system in seriatim. The apparatus contains a scale transport assembly for transporting mail pieces seriatim, a mail piece channel pathway assembly for maintaining the vertical orientation of individual mail pieces, a load cell assembly for measuring the mail piece weight, an x-y table assembly for allowing position adjustments of the weighing system, data collection circuitry, and a support module. The apparatus can be used in conjunction with bulk mail processing systems or it can be used independently.

18 Claims, 6 Drawing Sheets

MAIL WEIGHING SYSTEM AND SCALE APPARATUS

TECHNICAL FIELD

The present invention relates generally to the field of automated mail piece weighing systems, and more particularly to an automated mail piece handling system with an incorporated weighing scale system utilized for postage verification and measurements.

BACKGROUND OF THE INVENTION

Automated mail processing machines and systems are well known and are commonly used to process bulk and large volume mailings. A typical mail processing system entails numerous complex components working harmoniously to quickly and efficiently process numerous mail pieces. Such typical components generally consist of a means for transporting the mail pieces through the system, a means of placing appropriate postage on the individual pieces, a means of measuring the dimensions of the pieces, a means of weighing the mail pieces to ensure postage conformity, a means of sealing typical self-sealable envelopes, as well as other components which aid in the production and handling of mail pieces.

Typically, mail pieces are placed on the transport means, which delivers the mail pieces seriatim to the means of weighing and measuring the mail piece dimensions. After the mail piece weight and dimensions have been calculated, the correct postage can be calculated, or the individual mail piece can be rejected if the weighing and dimension measurements are set to pre-determined levels. The types of systems using such a weighing means can be infinite. However, as just described, this process must proceed extremely rapidly, be reliable and efficient.

In order to achieve the rapidity, reliability, and efficiency criterion, human intervention must be kept to an absolute minimum. As such, the mail processing machine must be able to handle a vast assortment of mail pieces with varying weights and thickness. It is thus essential that the weighing scale component of the system is reliable, by decreasing complexity in moving parts and accessories, as well as increasing the scale's accuracy and efficiency in order to ensure that the correct postage is calculated and attributable to each individual mail piece.

As alluded to above, mail piece weighing systems conduct two alternative functions within a mail processing system. One is simply weight verification by ensuring that each individual mail piece conforms to predetermined criteria. An alternate function is to calculate the weight of the mail piece and thus automatically transfix the appropriate postage to the mail piece based upon the determined weight. As such, typical mail weighing scale systems must stop a mail piece on top of the scale in order to ensure accurate measurements. However, this process is time consuming because it decreases the amount of mail pieces that can be processed by prolonging the verification and calculation process. Furthermore, typical mail weighing scale systems contain a plethora of complex components and gadgetry, thus having a great tendency to break-down and decrease reliable functionality.

U.S. Pat. No. 5,726,393 to Lyga issued on Mar. 10, 1998 discloses a fixed transport assembly for a mail weighing scale. The disclosed mail weighing scale is intended to be used in conjunction with a mail piece processing system, as described above. The Lyga invention uses a single load cell placed beneath a scale platform. Mail pieces are individually fed onto the scale platform via an incorporated drive belt mechanism. The mail piece is thus stopped, in a horizontal position, on the scale platform and held in place with a vertical force. The load cell, taking into account the tare weight of the scale and vertical force, calculates the mail piece weight. However, this invention has many drawbacks. For one, the mail pieces must be manipulated into a horizontal position in order to be fed into the scale assembly. Furthermore, the system must constantly recalibrate itself to ensure that the scale platform and components associated therewith are taken into account with the tare weight of the scale system. If the calibration is not correct, the reliability and accuracy of the weighing scale is detrimentally effected. Lastly, in order to properly calculate the weight of each mail piece, each piece must momentarily stop on the scale while it is weighed. This thus decreases the mail piece output and efficiency of the system. The present invention overcomes these limitations by continuously weighing the mail pieces in a vertical orientation, without the need to stop the pieces, and providing quick and accurate self-calibration techniques.

U.S. Pat. No. 5,014,797 to Dolan et. al. issued on May 14, 1991 discloses a means of weighing individual mail pieces in a mail processing system. However, a major disadvantage to the Dolan et. al. patent is that each individual mail piece must be clamped to the weighing plate during the weighing phase and to promote transport of the mail piece. As such, the Dolan et. al. patent is very inefficient and is a time consuming process. The present invention overcomes this limitation by not requiring the individual clamping of each mail piece, thus providing a more efficient and time effective means of weighing a plurality of mail pieces.

U.S. Pat. No. 4,856,602, to Cordery et. al. issued on Aug. 15, 1989, discloses a weighing scale that calculates the weight of an object by detecting the shift in the period of harmonic oscillations of a flexibly mounted platform. The invention must first measure the harmonic resonance of the flexible platform prior to the introduction of the object to be mailed. The object is then placed on the platform and a new harmonic resonance is measured. The difference in the harmonic oscillations of the flexible platform determines the object's weight. However, a major drawback to such an invention is the inability to accurately measure the weight of small, light objects due to the apparent lack of perceptible resonance shifts. As such, the Cordery et. al. invention is more suited to bulk packaging and larger mail pieces with weight atypical to conventional mail envelopes. The present invention overcomes this limitation by being better suited to accurately weigh smaller mail pieces by not measuring minute harmonic oscillations.

U.S. Pat. No. 4,787,046 to Feinland et. al. issued on Nov. 22, 1988 discloses a manually operated mail processing system. The user places an individual mail piece on a conventional scale, the scale then calculates the weight of the mail piece and thus determines the correct amount of postage. However, the Feinland et. al. invention can not be used on larger scale bulk mailing because each individual mail piece must be manually manipulated. The present invention overcomes this limitation by being specifically adaptable to use within a complex mass mail processing system. Furthermore, the preferred embodiment of the present invention automatically forwards the weight information to the appropriate systems, thus negating the need for manual input and manipulation. Lastly, the present invention does not require that each mail piece be manually placed upon the scale assembly.

U.S. Pat. No. 3,643,798 to Krupotich issued on Feb. 22, 1972 discloses a mail weighing and sorting machine for large packages. The system has the ability to automatically reject packages which weigh more than a pre-determined criterion. However, the Krupotich patent is not suited for typical bulk mail pieces and cannot be incorporated into a mail processing system. The present invention overcomes this limitation by specifically being adaptable for smaller, conventional sized mailings and not bulk mail packages.

OBJECTS OF THE INVENTION

An object of the present invention is to increase the efficiency and reliability of bulk mail processing systems by providing an accurate method of quickly calculating the weight of individual mail pieces.

Yet another object of the present invention is to increase a mail piece weigh scale's reliability by decreasing the scale's complexity and required components.

Yet another object of the present invention is to increase the throughput of a mail weighing scale system by not requiring the stoppage of individual mail pieces on the scale system.

Numerous other objects, features and advantages of the present invention will become readily apparent through the detailed description of the preferred embodiment, drawings and the claims.

SUMMARY OF THE INVENTION

The preferred embodiment of the present invention comprises a mail weighing scale apparatus having a means for transporting seriatim mail pieces in a continuously flowing manner, which does not require individual mail pieces to momentarily stop upon the scale device to obtain an accurate measurement. The preferred embodiment uses a conventional conveyor belt with a belt material that provides enough friction to controllably secure mail pieces in the weighing scale system. The individual mail pieces can be oriented in any manner, however the preferred embodiment weighs the individual mail pieces in a vertical orientation. The vertical orientation is maintained by using a congruently formed mail piece feed channel which ensures that each mail piece is oriented in a vertical fashion to enhance accuracy and speed. Beneath the means to transport the mail pieces is a means to measure the weight of objects placed on the transporting means. The preferred embodiment uses a plurality of load cells to accurately measure an object's weight by calculating the vertical displacement of the scale assembly.

The preferred embodiment further incorporates a data collection means to collect weight data. The load cells are connected to a processing unit, which automatically records weight measurement data and correlates such data to the indicia on the individual mail piece.

The preferred embodiment of the present invention is intended to be used as a component in a bulk mail processing system. However, as an alternate embodiment, the present invention can be used as a stand-alone mail weighing scale system.

DESCRIPTION OF THE DRAWINGS

A fuller understanding of the foregoing may be had by reference to the accompanying drawings, wherein.

DETAILED DESCRIPTION OF THE PREFERRED EMBODIMENT

While the invention is susceptible of embodiment in many different forms, there will be described herein in detail, a preferred embodiment of the present invention. It should be understood, however, that the present disclosure is to be considered an exemplification of the principles of the invention and is not intended to limit the spirit and scope of the invention and/or claims of the embodiment illustrated.

Referring to FIGS. 1–17 in general, a preferred embodiment of the present invention is shown as a mail weighing scale system. The preferred embodiment is intended to be used in conjunction with a bulk mail processing system, however, it can be used independently for mail piece weighing. Furthermore, the preferred embodiment of the present invention is intended to weigh individual mail pieces oriented in a vertical fashion, however, it is foreseen that alternate embodiments can be used to measure any object in any orientation, as well as mail pieces in any orientation.

Figure 1:
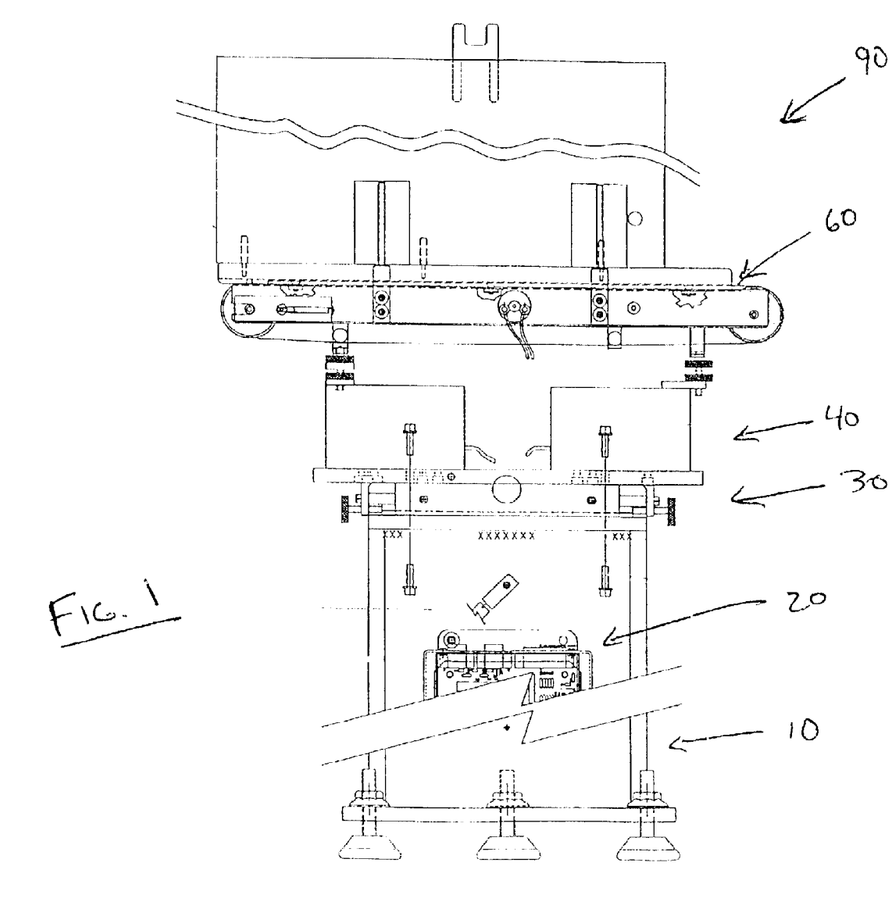
FIG. 1 is a partially broken away front side view of the present invention.

Referring now to FIG. 1, the present invention comprises generally, a sturdy base module 10, a weight measurement data collection means 20 mounted to the base module 10, an x-y table assembly 30 mounted atop the base module 10, a weighing means or load cell assembly 40 mounted atop the x-y table assembly 30, a transport means or scale transport assembly 60 mounted top the load cell assembly 40, and a mail piece channel pathway assembly 90 mounted to the scale transport assembly 60. The preferred embodiment can be constructed of any durable material, such as metals, plastics, fiberglass, and the like.

Figure 2:
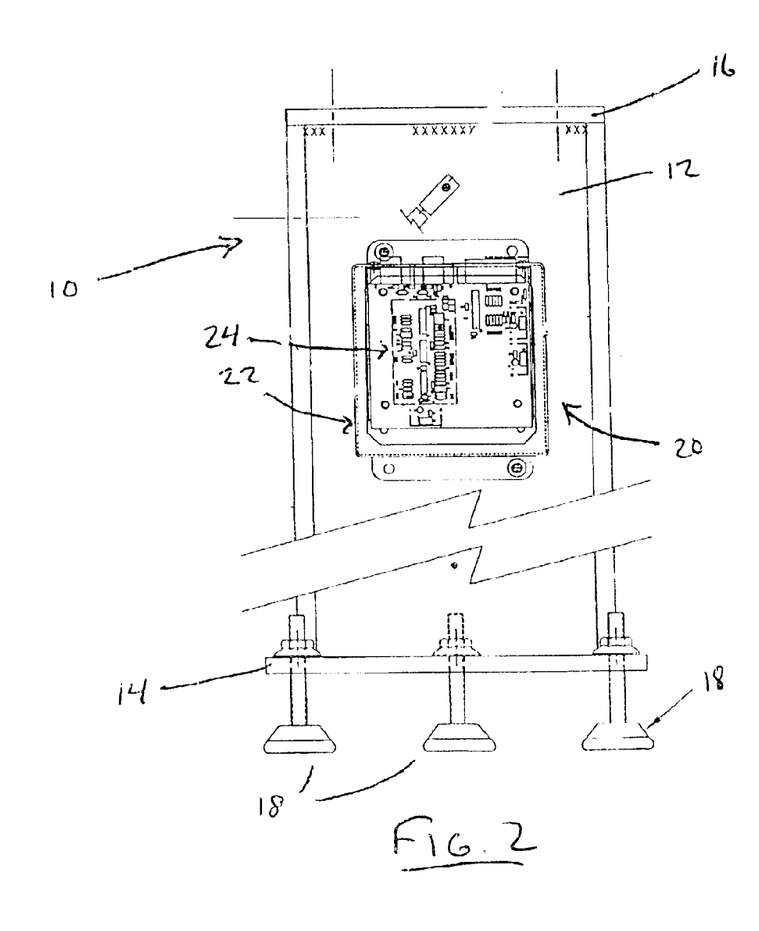
FIG. 2 is a partially broken away front side view of the base module of the present invention depicting the preferred location of the data collection means within the base module.
Figure 3:
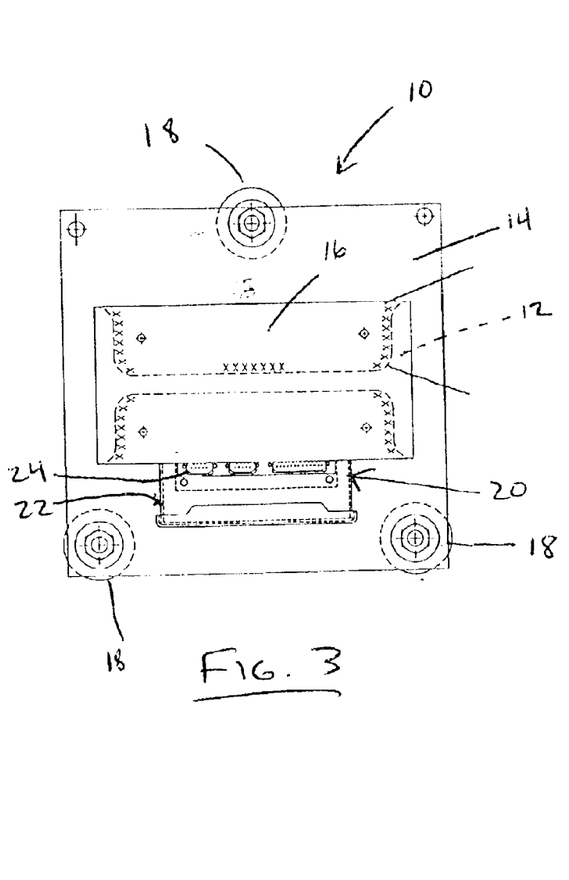
FIG. 3 is a top plan view of the base module of FIG. 2.
Figure 4:
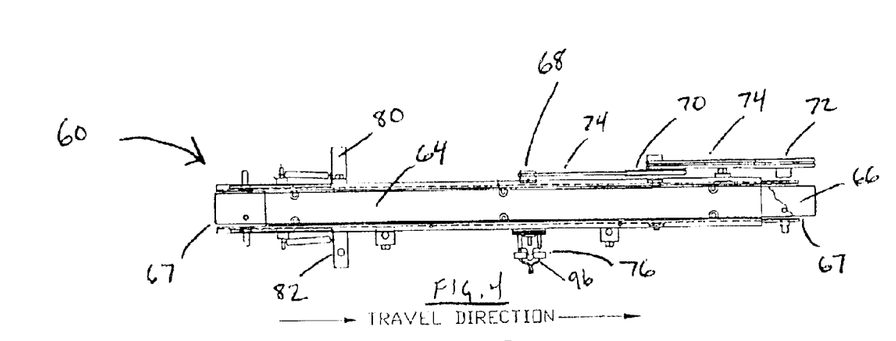
FIG. 4 is a top plan view of the transport assembly and channel pathway assembly for mail pieces.
Figure 5:
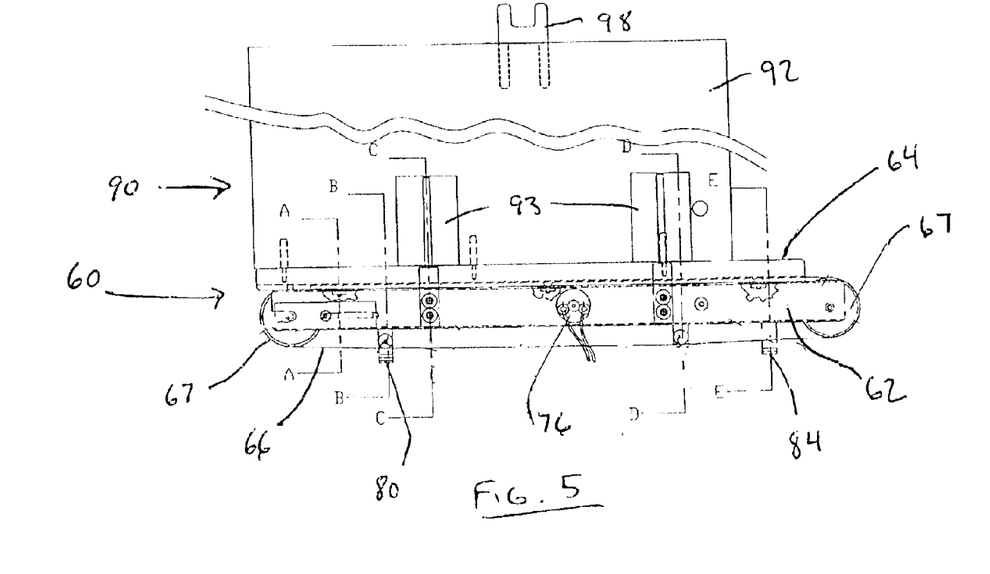
FIG. 5 is a front side view of the transport assembly and channel pathway assembly of the present invention.
Figures 6A, 6B:
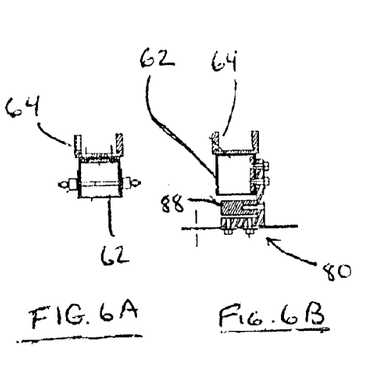
FIG. 6A is a cross-sectional view taken along line A—A of FIG. 5.
FIG. 6B is a cross-sectional view taken along line B—B of FIG. 5.
Figure 6C:
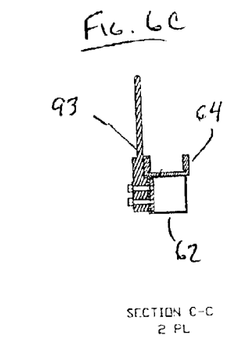
FIG. 6C is a cross-sectional view taken along line C—C of FIG. 5.
Figure 6D:
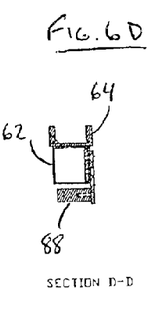
FIG. 6D is a cross-sectional view taken along line D—D of FIG. 5.
Figure 6E:
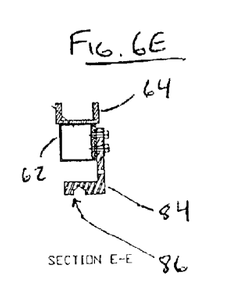
FIG. 6E is a cross-sectional view taken along line E—E of FIG. 5.
Figure 7:
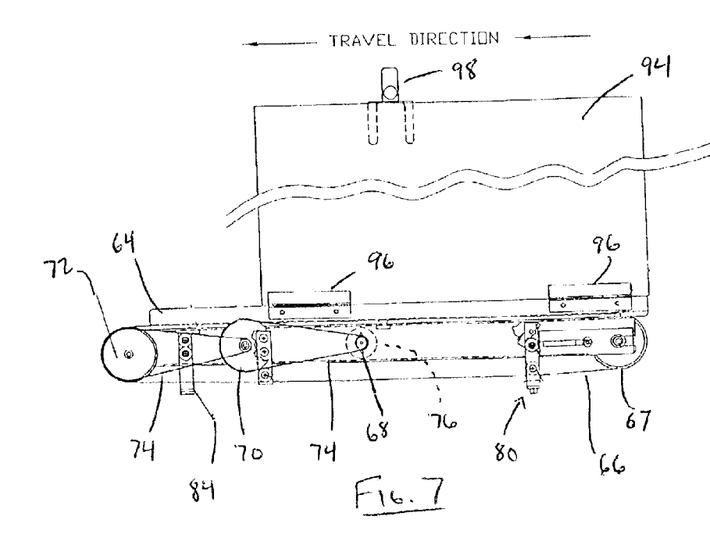
FIG. 7 is a back side view of the transport assembly and channel pathway assembly of the present invention.
Figure 8:
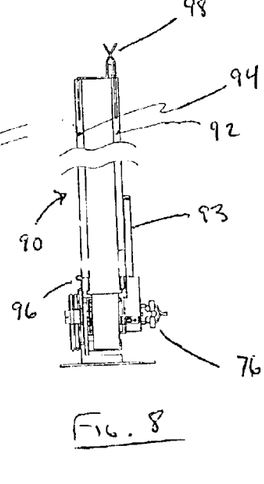
FIG. 8 is a right end view of the transport assembly and channel pathway assembly for mail pieces.
Figure 9:
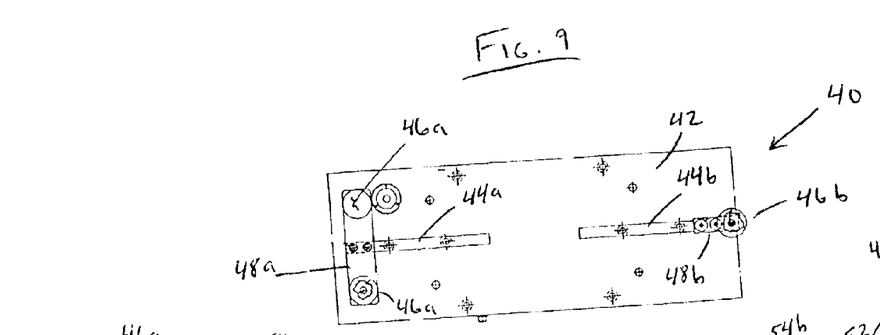
FIG. 9 is a top plan view of the load cell assembly of the present invention.
Figure 10:
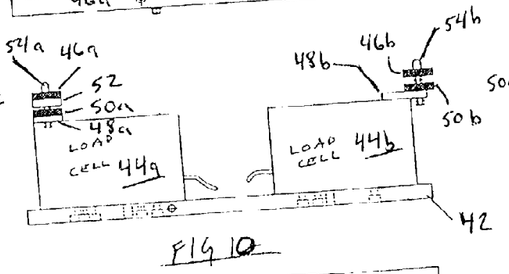
FIG. 10 is a front side view of the load cell assembly of the present invention.
Figure 11:
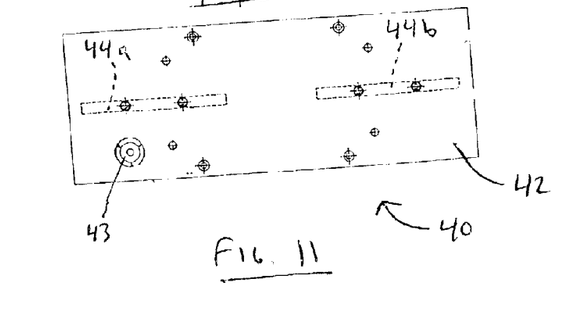
FIG. 11 is a bottom plan view of the load cell assembly of the present invention.
Figure 12:
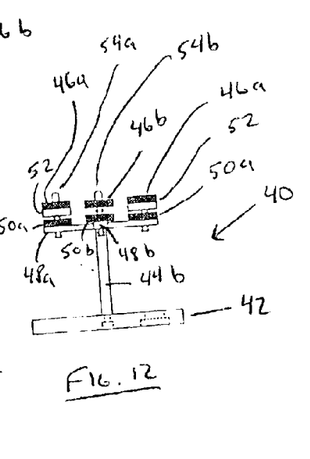
FIG. 12 is a right end view of the load cell assembly of the present invention.
Figure 13:
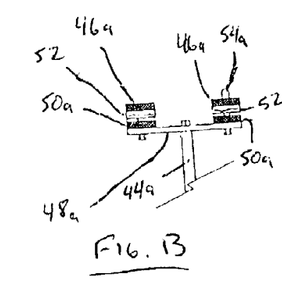
FIG. 13 is a partial left end view of the load cell assembly of the present invention.
Figures 14, 15, 16, 17:
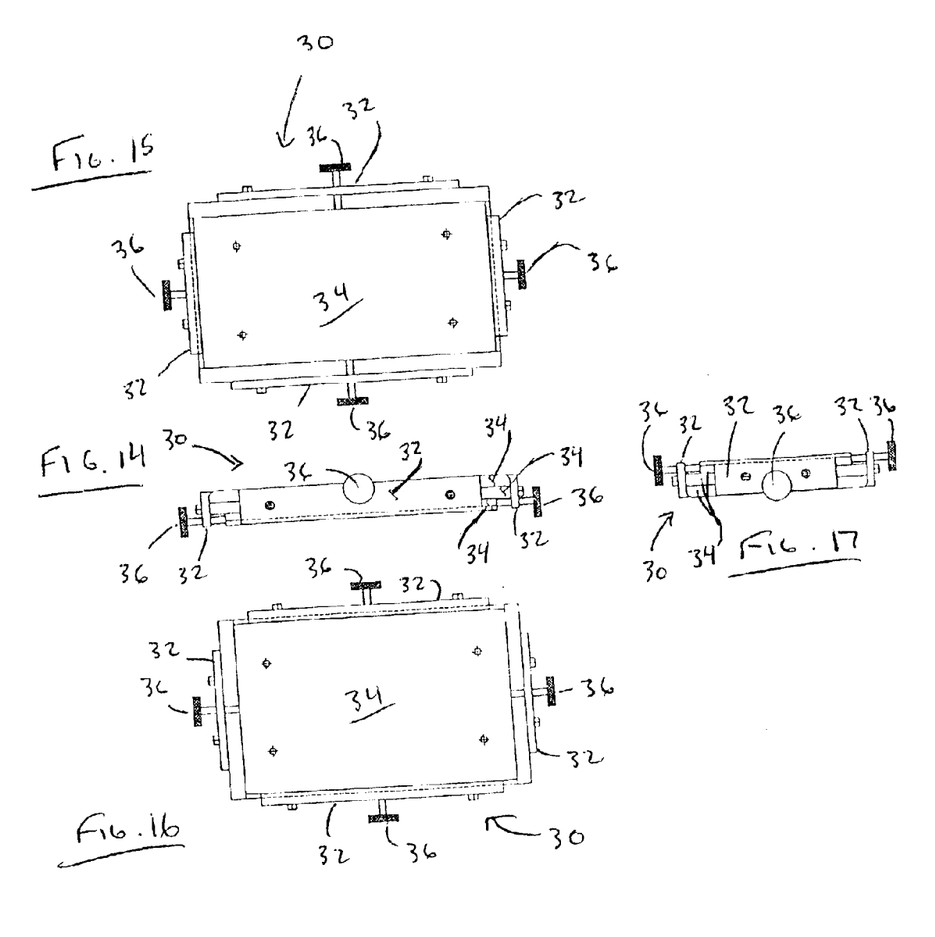
FIG. 14 is a front plan view of the x-y table assembly of the present invention.
FIG. 15 is a top plan view of the x-y table assembly of the present invention.
FIG. 16 is a bottom plan view of the x-y table assembly of the present invention.
FIG. 17 is a side plan view of the x-y table assembly of the present invention.

Referring to FIGS. 2–3, the base module 10 and the data collection means 20 are shown. The base module 10 takes the form of an I-beam 12 having a base plate 14 and a top plate 16 suitably fastened thereto. Affixed to the base plate 14 are a plurality of vibration isolating pedestal feet 18. While three feet 18 are illustrated, any suitable number of feet is contemplated. While the use of an I-beam is preferred, it should be understood that any suitable base or frame structure is also contemplated. However, it is desired that the mass of the base module 10 be substantially greater than the mass of the scale transport assembly 60.

The weight measurement data collection means 20 is mounted to the base module 10, preferably as close as possible to the load cell assembly 40 output locations in order to minimize electrical noise interference. It is to be understood, of course, that the weight measurement data collection means 20 can be located anywhere. The data collection means 20 is mounted to base module 10 via a housing 22, which houses data collection circuitry 22. This circuitry 22 preferably comprises an analog amplifier, filters and an analog-to-digital converter that converts the analog weight measurement information and transfers the same to an outside computer system. An alternate embodiment of the present invention uses an internal central processing unit (CPU) to collect and correlate weight measurement data along with the analog amplifier, filters and analog-to-digital converter. The preferred embodiment uses a data collection means with conventional serial port inputs and outputs for data transferring and handling. It is to be understood, of course, that any method of data collection and transfer connectivity can be utilized without detrimental effect upon the performance of the present invention.

The preferred embodiment further uses a base module material with rigid and sturdy qualities to minimize vibration variations during system operation. Such vibrations have a detrimental effect upon the accuracy of the scale system. To further enhance stability and lessen vibration influx, the preferred embodiment utilizes the vibration isolating pedestal feet 18. It is to be understood, of course, that numerous methods can be used to isolate vibration contamination. However, inherent with the operation of the system, some minimal vibration may occur. As such, the data collection means 20 has "vibration noise" filters incorporated into the recording and correlation programming to account for such vibration variations.

Referring to FIGS. 4–8, the scale transport assembly 60 and the mail piece channel pathway assembly 90 are illustrated. Scale transport assembly 60 comprises a scale transport base or beam 62 atop of which is mounted a scale track 64. A scale transport belt or conveyor belt 66 is operatively mounted around the track 64 and beam 62 via opposing scale belt pulleys 67. The conveyor belt 66 can be constructed of any material, but preferably is a resilient material to enhance frictional contact with individual mail pieces.

The conveyor belt 66 is driven by a transmission comprising a motor 76 operatively connected to a drive pulley assembly 68. Drive pulley assembly 68 is operatively connected to an intermediate pulley assembly 70 via a transmission belt 74. Intermediate pulley assembly is operatively connected to an end pulley assembly 72 via another transmission belt 74. End pulley assembly 72 is operatively connected to one of the scale belt pulleys 67 to drive the pulley 67 and in turn, the conveyor belt 66. To combat unwanted vibrations, a plurality of dampening bumpers 88 are mounted under the scale transport beam 62 at locations along the span of the beam 62, as illustrated.

As can be seen in FIG. 1, scale transport assembly 60 rests atop load cell assembly, at two mounting locations. Referring now back to FIGS. 4, 5, 6B and 6E, attached to the scale transport beam 62 is a first mounting bracket 80 and a second mounting bracket or grooved bracket 84 which engage the load cell assembly 40 as will be described in more detail below.

The channel pathway assembly 90 comprises two sidewalls 92 and 94 which form a channel pathway for the mail pieces. Sidewall 92 is mounted on one side of the scale track 64 via suitable mounting brackets 93. Sidewall 94 is preferably pivotally mounted to the opposite side of the scale track via hinges 96, which allows the sidewall to open to clear any jams or mis-fed mail pieces. The sidewalls 92 and 94 are selectively held together in a spaced apart, upright position by any suitable clamping apparatus, such as removable fork 98, as illustrated.

Referring now to FIGS. 9–13, the load cell assembly 40 is depicted therein. A scale plate 42 supports two load cells 44a and 44b configured in parallel and fixedly attached thereto. Such a configuration enhances reliability and accuracy. The scale plate 42 preferably includes a built in bubble level 43 or the like to ease system setup. Scale plate 42 is suitably mounted to x-y table assembly 30 (see FIG. 1).

Attached to the load cells 44a, 44b are a dual adjusting bracket 48a and a single adjusting bracket 48b, respectively. The dual adjusting bracket 48a supports two adjuster assemblies 46a. The single adjusting bracket 48b supports one adjuster assembly 46b. The adjuster assemblies 46a and 46b support the scale transport assembly 60. As previously referred to, mounting bracket 80 of scale transport assembly 60 rests across the two adjuster assemblies 46a. Mounting bracket 80 includes a hole 82 (see FIG. 4) that engages a pin 54a on one of the adjuster assemblies 46a to provide accurate location of the scale transport assembly 60 on the load cell assembly 40. Similarly, grooved mounting bracket 84 of scale transport assembly 60 rests on adjuster assembly 46b. Grooved mounting bracket 84 includes a groove 86 (see FIG. 6E) that engages a pin 54b on the adjuster assembly 46b. This groove arrangement provides accommodation for thermal expansion.

The adjuster assembly 46a having pin 54a contains a Teflon-ceramic coating so varying rates of thermal expansion in a horizontal direction between the load cell assembly 40 and the scale transport assembly 60 will be accommodated by low-friction sliding, rather than showing up as a signal from the load cells if the scale transport assembly 60 was rigidly attached to both load cells. Mounting brackets 82 and 84 also preferably contain a Teflon-ceramic coating. The other adjuster assembly 46a preferably contains a nylon sliding surface. Lock wheels 50a and 50b selectively hold adjuster assemblies 46a and 46b, respectively, in a desired position.

Magnets 52 are provided on adjuster assemblies 46a to detachably hold the scale transport assembly 60 to the load cell assembly 40. Since upward forces on the load cells can easily destroy the load cells, the magnets 52 eliminate the danger of a rigid attachment, yet holds the scale transport assembly 60 in place without looseness and/or vibration. This provides for the accurate measuring of downward forces, while preventing damage to the load cells from said upward forces such as may be encountered by accident or during equipment servicing or transport.

Referring now to FIGS. 14–17, the x-y table assembly 30 is illustrated. The x-y table assembly 30 comprises a plurality of platens 34 (three as depicted) held in place by a plurality of cleats 32, one on each side of the platens 34. A plurality of thumb screws 36 are provided which allow small position adjustments of the load cell assembly 40 (and scale transport assembly 60) mounted thereto, as should be readily understood.

Operation of the present invention is such that the scale transport assembly 60 transports mail pieces seriatim through the mail piece channel pathway. The mail piece channel pathway assembly 90 ensures that each mail piece is weighed individually in a vertical position. The mail pieces travel across the top face of the scale track 64 on conveyor belt 66 at a constant velocity, without momentarily stopping, wherein the scale transport assembly 60 deflects vertically downward due to the weight of the mail piece. The scale transport assembly 60 and mail piece channel pathway assembly 90 are calibrated into the tare weight of load cell assembly. A sensor or sensors, such as photo cells, are suitably located at a desired location or locations along the scale track 64 to notify the load cell assembly 40 that a mail piece is present and to thus commence weight measurement. The plurality of load cells measure the downward deflection force caused by the weight of the mail pieces and transfer the weight data to the data collection means 20 for weight calculation. The weight is then determined and recorded. Optionally, the weight can be displayed to an operator as well.

The foregoing specification describes only the preferred embodiment of the invention as shown. Other embodiments besides the above may be articulated as well. The terms and expressions therefore serve only to describe the invention by example only and not to limit the invention. It is expected that others will perceive differences, which while differing from the foregoing, do not depart from the spirit and scope of the invention herein described and claimed.

What is claimed is:

1. A mail piece weighing scale apparatus comprising:
   a scale transport assembly for transporting mail pieces seriatim;
   a load cell assembly for measuring said mail pieces one at a time as said mail pieces are transported by said scale transport assembly; and
   an x-y table assembly for making position adjustments to said apparatus.

2. The mail piece weighing scale apparatus as claimed in claim 1 further comprising a means for collecting weight data.

3. The mail piece weighing scale apparatus as claimed in claim 1 wherein said transport assembly comprises a conveyor belt mechanism.

4. The mail weighing scale apparatus as claimed in claim 1 wherein said load cell assembly comprises a plurality of load cells.

5. The mail weighing scale apparatus as claimed in claim 1 wherein said scale transport assembly is detachably supported atop of said load cell assembly.

6. The mail weighing scale apparatus as claimed in claim 1 further comprising a channel pathway assembly having a pair of sidewalls forming a channel pathway on the scale transport assembly.

7. The mail weighing scale apparatus as claimed in claim 6 wherein at least one of said pair of sidewalls is hinged to provide access to said channel pathway.

8. The mail weighing scale apparatus as claimed in claim 1 further including a base module.

9. A method of weighing individual mail pieces comprising the steps of:
   mounting a scale transport assembly on a load cell assembly;
   mounting the load cell assembly to an adjustable table assembly;
   feeding a series of mail pieces onto said scale transport assembly;
   continuously transporting said mail pieces seriatim through a mail piece channel pathway assembly; and
   weighing each individual mail piece while said mail piece travels through said channel pathway assembly.

10. A mail piece weighing scale apparatus comprising:
    a load cell assembly comprising a first load cell and a second load cell;
    a scale transport assembly; and
    a support assembly mounted on the load cell assembly, wherein the scale transport assembly is supported by the support assembly; and
    wherein the support assembly includes a first adjusting bracket mounted to the first load cell and a second adjusting bracket mounted to the second load cell.

11. The mail piece weighing scale apparatus of claim 10, wherein the support assembly further includes at least one adjuster assembly mounted to the first adjusting bracket, and at least one adjuster assembly mounted to the second adjusting bracket.

12. The mail piece weighing scale apparatus of claim 11, wherein the at least one adjuster assembly mounted to the first adjusting bracket includes a magnet.

13. The mail piece weighing scale apparatus of claim 11, wherein the at least one adjuster assembly mounted to the first adjusting bracket comprises a first adjuster assembly and a second adjuster assembly.

14. The mail piece weighing scale apparatus of claim 13, wherein the first adjuster assembly has a Teflon-ceramic coating.

15. The mail piece weighing scale apparatus of claim 13, wherein the second adjuster assembly has a nylon sliding surface.

16. The mail piece weighing scale apparatus of claim 11, wherein the scale transport assembly includes a first mounting bracket for resting upon the at least one adjuster assembly mounted to the first adjusting bracket, and a second mounting bracket for resting upon the at least one adjuster assembly mounted to the second adjusting bracket.

17. The mail piece weighing scale apparatus of claim 16, wherein the first mounting bracket includes at least one hole for engaging a pin on the at least one adjuster assembly mounted on the first adjusting bracket.

18. The mail piece weighing scale apparatus of claim 16, wherein the second mounting bracket includes a groove for engaging a pin on the at least one adjuster assembly mounted on the second adjusting bracket.

* * * * *